J. Jones,
Tile Machine.
N° 22,730.      Patented Jan. 25, 1859.
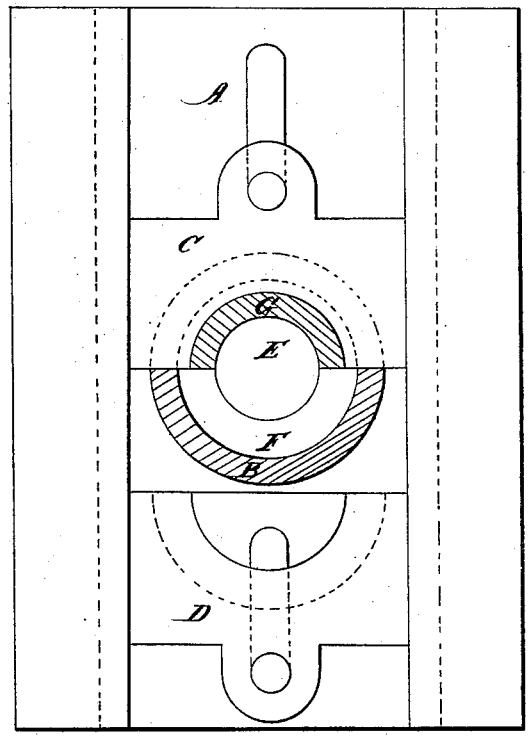
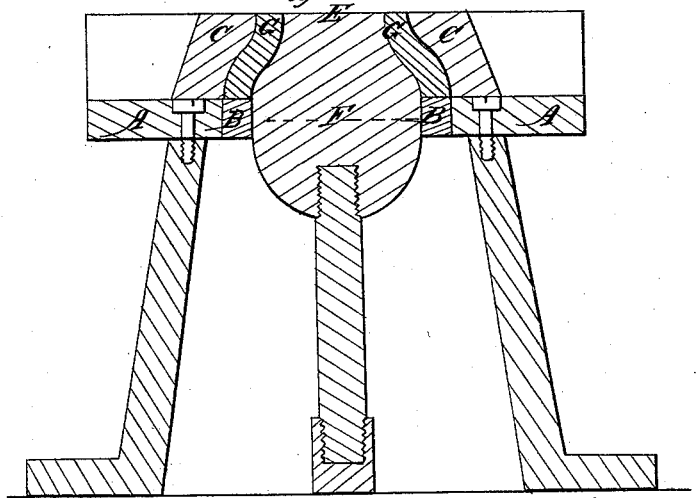
Witnesses.      Inventor

UNITED STATES PATENT OFFICE.

JNO. JONES, OF BALTIMORE, MARYLAND.

MACHINE FOR MAKING CLAY PIPE.

Specification of Letters Patent No. 22,730, dated January 25, 1859.

*To all whom it may concern:*

Be it known that I, JOHN JONES, of the city of Baltimore and State of Maryland, have invented a new and useful Machine for Making, in Continuous Lengths, a Tube, of Different Sizes, of Clay or other Plastic Material; and I do hereby declare that the following is a full, clear, and exact description of the construction and operation of the same, reference being had to the annexed drawings, making a part of this specification, in which—

Figure 1 is a front, and Fig. 2 a horizontal section of one of my machines.

The machine as shown by the drawings is attached to the discharging end of any plastic pipe machine and the material driven through the openings by means of piston or any other device.

The plate A, Figs. 1 and 2, has an opening B over which the two jaws C, D move parallel to each other by means of lever or otherwise and meet at the center. The core mandrel E has two sizes, the larger F corresponding to the opening B in the die plate A and the smaller size E corresponding with the opening G in the jaws C, D. In use the jaws are closed and the material forced through the small opening G; and when the tube has attained a sufficient length, the jaws C D are thrown open and the tube continued through the opening B of a layer size.

In the drawing my improvement is represented single, but it is obvious that several of my improved devices may be applied to a single plastic machine, consisting of a suitable receptacle for the material and a plunger or piston operated in the usual manner.

I am aware that machines have been made for molding collars or sockets, in limited lengths, of a size larger than the main pipe. The method of their working is to support a core pin for the collar or socket against the core of the pipe, and, by means of levers or otherwise, close around this a pair of molds, the small end of which molds, corresponds to the opening in the pipe die. The space all around between the molds and the core-pin, is of the required size and thickness of the collar or socket. When so arranged the material is forced from the press until the mold is filled, when the pressure is stopped, the molds are thrown open and the core pin removed leaving the core for the pipe, when the pressure is again applied and the operation continued. My machine differs from these in not using a mold, which requires the machine to stop to enable the workman to remove the large core or core pin, it being stationary. In mine the pipe may be formed of both sizes by a continuous operation, and the change from the small to the large size is effected by opening the jaws surrounding (at a suitable distance for the thickness of the pipe) the small part of the core pin.

The machine referred to, molds the collars or sockets before the pipes are made and requires the arranging and removal of the large core pin upon the molding of each collar, and its operations are confined to limited lengths, whereas my device forms the small pipe first, as already described, and of any required length, and the large pipe last, also of any required length.

My arrangement as described facilitates the operation by removing the necessity of adjusting and removing the core pin, and improves the operation, by not confining, either sized pipe to a limited length as by the ordinary molding apparatus.

I do not claim the manufacture of pipe of two sizes, as various devices of molds have been used for that purpose; but

What I claim as my invention and desire to secure by Letters Patent is—

The two sized permanent core or mandrel in combination with the fixed die A and adjustable jaws C, D constructed arranged and operating in the manner described for the purpose specified.

JOHN JONES.

Witnesses:
ROSA FISH,
WM. T. OUTTEN.